E. V. LYNCH.
RAIL SPIKE.
APPLICATION FILED JUNE 30, 1915.
1,194,047.
Patented Aug. 8, 1916.
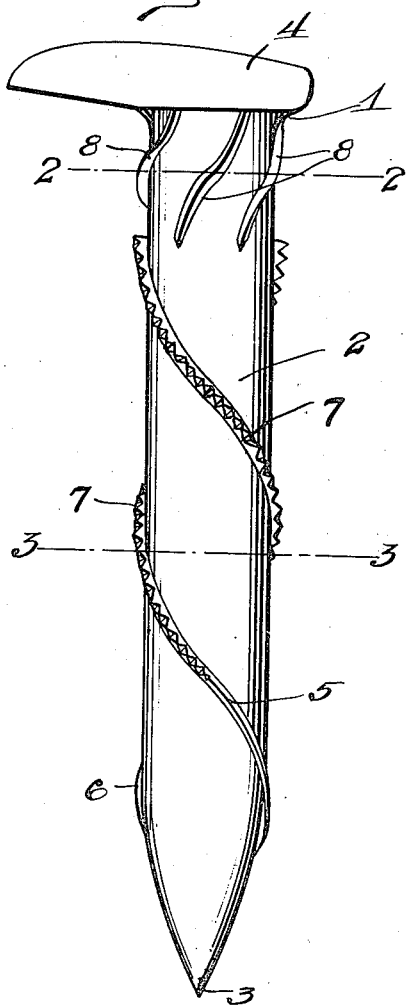
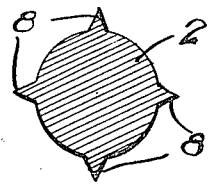
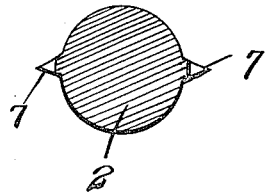
Witnesses
Inventor
Eugene V Lynch
By Richard Owen
Attorney ial or rotary movement.
UNITED STATES PATENT OFFICE.

EUGENE V. LYNCH, OF NEW YORK, N. Y.

RAIL-SPIKE.

1,194,047.

Specification of Letters Patent.

Patented Aug. 8, 1916.

Application filed June 30, 1915. Serial No. 37,294.

*To all whom it may concern:*

Be it known that I, EUGENE V. LYNCH, a citizen of the United States, residing at New York, in the county of New York and State of New York, have invented certain new and useful Improvements in Rail-Spikes, of which the following is a specification.

This invention relates to rail spikes, especially that type in which a locking means is provided, in order to hold the spike from casual displacement.

Another object of the invention is to provide a locking means, which is integrally formed with the spike, thereby reducing the cost of manufacture to a minimum, at the same time avoiding the use of various locking means, which are movably associated with the spike.

Another object of the invention is to provide a locking means which will not appreciably impede penetration of the spike, but will positively retain the spike from vertical or rotary movement.

Other objects as well as the nature, characteristic features and scope of my invention will be more readily understood from the following description taken in connection with the accompanying drawings, and pointed out in the claims forming a part of this specification.

Referring to the drawings:—Figure 1 is a side elevational view of a spike constructed in accordance with my invention. Fig. 2 is a cross sectional view taken on the line 2—2 of Fig. 1, and Fig. 3 is a cross sectional view taken on the line 3—3 of Fig. 1.

In the drawings a rail spike generally designated 1 is provided which in the present instance comprises a cylindrical shank 2, the lower end 3 of which is of a conical configuration and tapers to a point. The upper end has a head 4 formed thereon which is of the usual configuration.

Formed upon the outer periphery of the shank 2 are a pair of spirally arranged ribs 5 and 6, each of which gradually increases in height from the conical end 3 of the shank toward the head 4 and terminates short of said head. As illustrated to advantage in Fig. 1, the lower ends of the ribs 5 and 6 are of a substantially V-shaped configuration in cross section, the apex thereof forming a knife edge in order to facilitate penetration of the spike, while the upper ends of said ribs are provided with teeth 7 thereby reducing possibility, of the spike being casually displaced, to a minimum.

It will be appreciated that by the gradual increase in size of the ribs 5 and 6, that penetration will be in no way impeded, but at the same time a positive locking means will be provided, since the teeth 7 will bite into the object into which the spike is driven thereby preventing vertical displacement of the spike.

In order to prevent rotary movement of the spike, suitable spirally arranged ribs 8 are formed upon the periphery of the shank 2, one end of each of which contacts with the inner face of the head 4, while the opposite ends of each depend to a point within the plane of the upper terminals of the ribs 5 and 6. As shown to advantage in Fig. 2, each of the ribs 8 is of a V-shaped configuration in cross section, whereby the object engaging portions of said ribs provide knife edges which cut into the object, thereby positively holding the spike from rotary movement.

In driving the spike into an object, it will be seen that the spike will move approximately one half a revolution, during the embedding of the shank in the object, but just as soon as the ribs 8 start to take effect in the object, rotary movement will be curtailed from thenceforth. By this formation, therefore, it is seen that the spike may be readily penetrated in an object, in the usual manner, but will be positively held from casual displacement, even in the event that undue pressure is exerted thereon.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

Having thus fully described my invention, what I claim as new and desire to secure by Letters Patent is:—

1. A rail spike including a shank having a pointed end and a head, spiral ribs gradually increasing in height from the pointed end toward the head and terminating a distance therefrom, and oppositely arranged spiral ribs extending downwardly from the head.

2. A rail spike including a shank having a pointed end and a head, spiral ribs extending upwardly from the pointed end and increasing in size the more remote from the point, said ribs having a portion thereof tapered to a cutting edge and the remainder provided with a serrated edge, and oppositely arranged spiral ribs extending downward from the head.

3. A rail spike including a shank having a pointed end and a head, spiral ribs extending upwardly from the pointed end and terminating at a distance from the head, and oppositely arranged spiral ribs extending downwardly from the head.

4. A rail spike including a shank having a pointed end and a head, spiral ribs extending upwardly from the pointed end and terminating at a distance from the head, and oppositely arranged spiral ribs extending downwardly from the head and terminating between the first mentioned ribs in the plane of the upper ends thereof.

In testimony whereof I affix my signature in presence of two witnesses.

EUGENE V. LYNCH.

Witnesses:
H. LANGDON LYNCH,
JOHN H. WILKENS.